United States Patent [19]
Willard

[11] 3,803,455
[45] Apr. 9, 1974

[54] ELECTRIC CIRCUIT BREAKER STATIC TRIP UNIT WITH THERMAL OVERRIDE

[75] Inventor: Henry G. Willard, Wethersfield, Conn.

[73] Assignee: General Electric Company, New York, N.Y.

[22] Filed: Jan. 2, 1973

[21] Appl. No.: 320,150

[52] U.S. Cl................. 317/33 SC, 317/38, 317/41
[51] Int. Cl............................................. H02h 5/04
[58] Field of Search........ 317/33 SC, 36 TD, 38, 41

[56] References Cited
UNITED STATES PATENTS

| | | | |
|---|---|---|---|
| 3,440,491 | 4/1969 | Tenenbaum et al. | 317/38 X |
| 3,666,994 | 5/1972 | Watson et al. | 317/38 X |
| 3,713,004 | 1/1973 | Skeehan et al. | 317/38 X |
| 3,609,457 | 9/1971 | Squiers | 317/41 X |

Primary Examiner—James D. Trammell
Attorney, Agent, or Firm—Prutzman, Hayes, Kalb & Chilton

[57] ABSTRACT

A polyphase circuit breaker having a static trip control circuit for tripping the circuit the circuit breaker upon the sensing of overcurrent and ground fault conditions of adjustable predetermined levels and duration is provided with a temperature override to safeguard the control circuit and its components against insulation damage and malfunction at excessive ambient temperatures. A voltage divider network comprising a resistor having a fixed resistance and a thermistor having a resistance which changes significantly with temperature change is connected to the base of a transistor to control the conduction of the transistor at about 80° C to cause the energization of the trip coil of the circuit breaker.

8 Claims, 1 Drawing Figure

PATENTED APR 9 1974
3,803,455
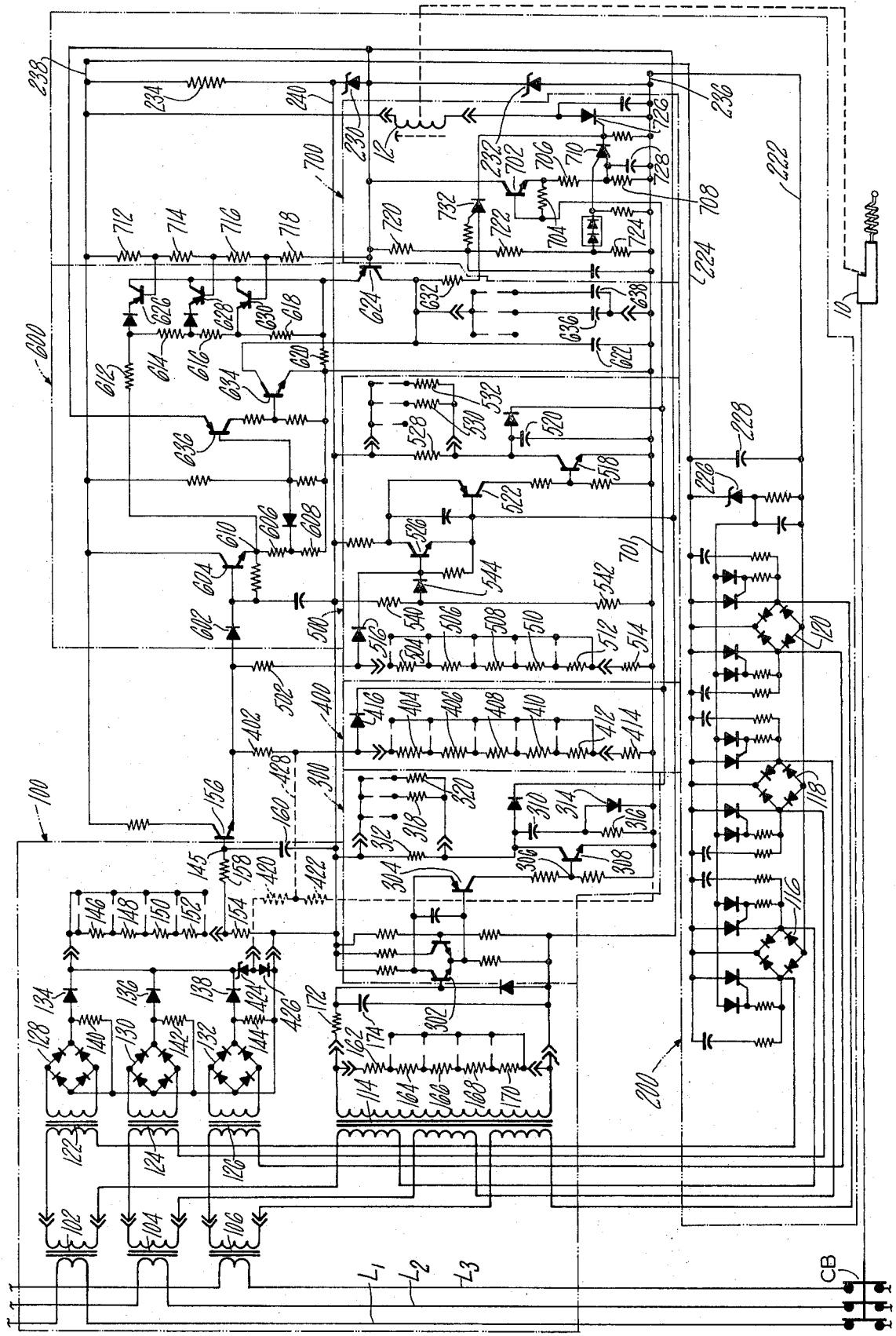

ELECTRIC CIRCUIT BREAKER STATIC TRIP UNIT WITH THERMAL OVERRIDE

BACKGROUND AND SUMMARY OF THE INVENTION

This invention relates to circuit breakers having overcurrent and ground fault sensing circuits of the static type for controlling the operation of a trip coil for the circuit breaker, and is particularly concerned with a thermal override for such circuit breakers.

A circuit breaker of the type involved in this invention includes an overcurrent protective device which is responsive to different current levels in the circuit to be protected to actuate a trip mechanism for the circuit breaker upon an overcurrent in the protected circuit which exceeds a predetermined current level for a predetermined interval of time which varies inversely with the current levels. The control circuit of a circuit breaker of the type contemplated by this invention includes solid state adjustable time delay circuits for instantaneous time delay, short time delay and long time delay actuation of the trip coil dependent upon the extent to which the current levels in the protected line providing the signal exceeds a predetermined level of line current.

Solid state electronic devices are quite sensitive to high temperatures and, in the case of silicon devices, when the ambient temperature approaches a level of about 90° C or more, the emitter-collector leakage may increase to the threshold level for gating the transistor to trigger the actuation of the circuit breaker regardless of current level in the protected lines.

Moreover, many insulating materials break down at temperatures of over 80° C and it is desirable to safeguard the components of the system regardless of the source of the heat. Accordingly, it is a primary object of this invention to provide a circuit breaker having a circuit provided with such protection.

Other objects will be in part obvious and in part pointed out more in detail hereinafter.

A better understanding of the invention will be obtained from the following detailed description and the accompanying drawing of an illustrative application of the invention.

These and other objectives are accomplished in accordance with the present invention by providing a circuit breaker having a static trip control circuit for tripping the circuit breaker upon the sensing of adjustable and variable current levels which includes a voltage divider comprising a fixed resistor and a resistor which is temperature sensitive to generate a signal which gates a control transistor, when the ambient temperature reaches a level of about 80° C, to energize the trip coil of the circuit breaker.

A BRIEF DESCRIPTION OF THE DRAWING

In the drawing, the single FIGURE is a schematic circuit diagram for a circuit breaker incorporating the invention.

DESCRIPTION OF A PREFERRED EMBODIMENT

Referring now to the drawing, there is illustrated a three phase electrical power system, which includes the line conductors $L_1$ and $L_2$ and $L_3$, protected by an associated circuit breaker CB whose operation is controlled by a latch schematically illustrated at 10. The latch 10 is controlled by a trip coil 12 which is energized in response to the operation of the control circuit upon the sensing of a predetermined excess current level or ground fault condition in one of the line conductors of the protected circuit to open the circuit breaker CB.

The circuit breaker CB segregates or isolates the protected circuit comprising conductors $L_1$, $L_2$ and $L_3$ from the source of AC power upon the occurrence of certain abnormal or fault conditions.

In general, the illustrated sensing and static control circuit of this invention is arranged to respond the highest of the peak line currents to flow in the conductors $L_1$, $L_2$ and $L_3$ to energize the trip coil 12 and to actuate the tripping of the circuit breaker CB either instantaneously upon the occurrence of a peak line current of, say, from 3 to 10 times a predetermined maximum current, after a short time delay of, say, up to 0.3 seconds upon the occurrence of a peak line current which exceeds the predetermined maximum current by a lesser amount of, say, 3 to 8 times the predetermined maximum current, and after a long time delay of, say, up to 10 minutes when the peak line current in any one of the conductors $L_1$, $L_2$ and $L_3$ exceeds the predetermined maximum current by, say, 5 to 10 percent.

As shown in the drawing, the illustrated sensing and control circuit comprises a signal sensing circuit generally indicated at 100 for generating a signal voltage proportional to the highest peak current which flows in any one of the conductors $L_1$, $L_2$ and $L_3$, a power supply circuit generally indicated at 200 for the DC bias voltages for the static control circuits as well as the power for energizing the trip coil 12 upon the occurrence of a predetermined fault condition, a ground fault control circuit 300, an instantaneous time delay control circuit 400, a short time delay control circuit 500, a long time delay control circuit 600, and an output circuit 700.

In order to obtain a plurality of output voltages which are directly proportional to the peak line currents in each of the line conductors $L_1$, $L_2$ and $L_3$, a plurality of current transformers or sensors 102, 104, 106, having iron cores which are not saturated at line current levels of up to 12 times or more rated current levels for protected lines $L_1$, $L_2$ and $L_3$ are provided.

The secondary windings of current transformers 102, 104 and 106 are respectively connected in series with one of the primary windings of the ground fault signal transformer 114 and with one of the full wave rectifiers 116, 118 and 120 of the power supply circuit and with the primaries of cascaded current transformers 122, 124, 126 which are electrically and magnetically isolated and independent of each other.

The secondaries of the current transformers 122, 124 and 126 are respectively connected to full wave rectifier bridges 128, 130 and 132 to provide output current signals through burden resistors 140, 142 and 144 which are proportional respectively to the peak currents in lines $L_1$, $L_2$ and $L_3$ and generate, at the inputs of the blocking diodes 134, 136 and 138 voltages of the same polarity, but independently representative of the peak current levels in each of the protected lines $L_1$, $L_2$ and $L_3$.

The outputs of the blocking diodes 134, 136 and 138 are connected together to produce a signal at control circuit input terminal 145 which is proportional to the highest peak current in one of the conductors $L_1$, $L_2$ and $L_3$, it being understood that the diodes 134, 136 and 138 are connected to form an OR circuit wherein the highest voltage delivered by one of these diodes back biases the other two and prevents their conduction of current.

The output of the OR circuit comprising diodes 134, 136 and 140, is delivered to an adjustable voltage divider network comprising resistors 146, 148 and 150, 152, 154 in which one or more of the resistors may be shunted to attenuate the signal and establish the level of signal imposed on the base of transistor 156 by a predetermined value of current in conductors $L_1$, $L_2$ or $L_3$. The resistor 158 serves a dual function of limiting the current delivered to the base of the transistor 156 and also forms with capacitor 160 an RC circuit for rejecting high frequencies signals which may be present in the voltage divider network 146–154.

As indicated above, the secondaries of transformers 102, 104 and 106 are each connected in series with one of the primaries of transformer 114 so that unbalanced current level in lines $L_1$, $L_2$ and $L_3$ results in an unbalanced flux in transformer 114 and induces a current in its secondary. This output current is dissipated through a voltage divider comprising a string of resistors 162, 164, 166, 168 and 170 and an RC circuit comprising resistor 172 and capacitor 174 to charge capacitor 174 at a rate representative of a ground fault in one of the lines $L_1$, $L_2$ and $L_3$. In this regard, and as shown in the drawing, the string of resistors 162–170 may be selectively shunted out of the circuit to control the charging rate for the capacitor and provide an output voltage signal thereacross which corresponds with a selected level of the predetermined level of unbalance in the line currents in $L_1$, $L_2$ and $L_3$. Resistor 172 and capacitor 174 also serve as a filter for the rejection of high frequency transients so that the resultant voltage signal across capacitor 174 is directly related to the unbalance in power frequency current of the protected high lines $L_1$, $L_2$ and $L_3$.

The power supply 200 receives its input from the same current transformers which provide signal power for overcurrents and ground fault protection. In addition to providing a plurality of filtered unidirectional voltages as required for biasing the solid state control circuits of the illustrated embodiment, the power supply also provides the source of power necessary to energize trip coil 12 to trip the circuit breaker. As is apparent from the drawing, the power supply provides a regulated voltage output across lines 222 and 224 with zener diode 226, serving to fix the voltage differential between these output terminals and capacitor 228 functioning as a smoothing filter for the control voltages.

As shown, zener diodes 230 and 232 are connected in series with resistor 234, to form a voltage divider network for providing the different levels of voltage required in the control circuit with bus 236 being at zero voltage, bus 238 at maximum control voltage, say, about 48 volts and bus 240 being at an intermediate voltage, say, about 18 volts.

The input signal circuit 100 delivers a pulsating voltage signal corresponding to the current condition existing in that phase of the three phase circuit having the highest instantaneous current level to the base of NPN transistor 156.

Transistor 156 is connected as an emitter-follower and serves as a current amplifier of the input signal. The emitter of transistor 156 is connected to instantaneous time delay control circuit 400 through a resistor 402 which is connected to ground bus 236 through an adjustable voltage divider network comprising resistors 404 to 414. It will be noted that these resistors may be selectively shunted out of the circuit to adjust the tripping level of the trip coil 12 of from, say, three to ten times rated instantaneous current in one of the protected lines $L_1$, $L_2$, $L_3$.

A diode 416 is connected to a junction between resistor 402 and the adjustable voltage divider network comprising resistors 404 to 414. The current through diode 416 flows through conductor 701 to the base of NPN transistor 702 to ground through resistance network 704, 706, and 708. Transistor 702 is connected as an emitter-follower and when the voltage signal at the base of transistor 702 reaches a level of approximately 12 volts with respect to ground, indicative of a very high instantaneous current in one of the protected conductors $L_1$, $L_2$ or $L_3$, the anode voltage of programable unijunction transistor PUT 710, which is connected to a junction between resistors 706 and 708 is raised to a level slightly higher than its gate voltage.

The gate of PUT 710 is connected to a junction of a voltage divider network comprising resistors 720, 722, and 724 to establish a fixed gate voltage for PUT 710. When the anode voltage of PUT 710 exceeds its gate voltage, the PUT is fired to trigger SCR 726 to energize trip coil 12, which is preferably of the design of Willard U.S. Pat. No. 3,693,122. In this regard, capacitor 228 of the power supply 200 is connected to deliver its stored energy to trip coil 12 and has the capacity of providing a pulse of the order of one ampere sufficient to energize the trip coil to trip the latch 10.

The conduction of transistor 702 also charges the capacitor 728 to maintain the anode voltage of PUT 710 at a sufficient level to maintain it in its conducting state although transistor 702 ceases to conduct.

Essentially no time delay is provided in the instantaneous time delay circuit, as described above so that, immediately upon the biasing voltage of transistor 702 reaching a triggering level for PUT 710, the energization of trip coil 12 is substantially simultaneous.

If desired, the adjustable instantaneous time delay circuit 400 may be replaced by a fixed instantaneous override circuit as shown in dashed lines. A fixed voltage divider comprising resistors 420, 422 connected to a terminal between zener diode 424 and oppositely poled diode, 426 is connected to diode 416 by lead 428. Resistors 402, and 404–414, are also eliminated along with any circuit connection with the output of transistor 156.

Where zener diode 424 is set to conduct at, say, 15 to 25 times maximum rated current in $L_1$, $L_2$, and $L_3$, transistor 702 is biased to conduction when this level is reached.

The output signal of transistor 156 is also fed to short time delay circuit 500 through a resistor 502 which is connected to ground bus 236 through an adjustable voltage divider comprising resistors 504, 506, 508, 510, 512, and 514 which may be selectively shunted out of the circuit to provide a current signal to diode 516, which corresponds to a multiple of the rated peak current in any of the three phases of $L_1$, $L_2$ and $L_3$, say, for example, from three to ten times the rated current. The short time delay circuit includes a NPN transistor 518 which is connected across intermediate bus 240 and the ground bus 236 and is normally in the ON position to clamp the time delay capacitor 520 to zero voltage. PNP transistor 522 is also gated to the ON position.

In the event that the output signal of transistor 156 becomes sufficient to produce a voltage across voltage divider 504–514 to cause a current flow through diode 516 and increase the voltage applied to the base of transistor 526 above the positive fixed voltage level of its emitter, the transistor 526 is gated to its conductive state which turns off the transistor 522 which in turn renders the transistor 518 non-conductive. When transistor 518 is non-conductive, the voltage of intermediate bus 240 is imposed across the charging circuit for capacitor 520.

In the event that the build-up of voltage across the capacitor 520 continues for a sufficient period of time to build-up a voltage sufficient to fire PUT 710 as hereinbefore described in connection with the instantaneous time delay control circuit, SCR 726 is rendered conductive and the tripping coil 12 energized to trip the latch 10 to open the circuit breaker CB.

It will be noted that the charging circuit for capacitor 520 includes resistor 528 which regulates the charging rate for the capacitor. Resistor 528 can be selectively paralleled with resistors 530 and 532 to adjust the time delay for any period of time, say, from 6 to 18 cycles to enable a downstream circuit breaker, if any, to open prior to the opening of the circuit breaker CB.

A single low peak in the instantaneous current in the protected conductor $L_1$, $L_2$, or $L_3$ responsible for the overcurrent condition responsible for the ouput of transistor 156 will render transistor 522 conductive. This in turn renders transistor 518 conductive to dump the charge in capacitor 520 so that the time delay provided by capacitor 520 is reset to zero.

The output of transistor 156 further provides an input signal to long time delay circuit 600 through an isolating diode 602 from whence it is delivered to NPN transistor 604 which is connected as an emitter follower to provide a second stage of current amplification. With transistor 604 in a conductive state, current flows from positive bus 238 through transistor 604, and a voltage divider comprising resistors 606 and 608 to ground bus 236. This current output of transistor 604 is proportional to the peak current of the phase of the protected conductors comprising lines $L_1$, $L_2$ and $L_3$ responsible for the overload condition being sensed and is fed to the voltage divider network comprising resistors 612, 614, 616, 618 and 620 which are connected between terminal 610 of transistor 604 and ground bus 236.

The output from the emitter of emitter-follower transistor 604 provides a charging current for capacitor 622 through a capacitor charging network including resistor 612, 614, 616, 618 and PNP transistor 624. The PNP transistors 626, 628, and 630, together with the voltage divider network comprising resistors 712, 714, 716, and 718 serve as a non-linear voltage charging network for capacitor 622 so that the charging rate of capacitor 622 increases as the square of the overload current in the one of the protected conductors $L_1$, $L_2$, $L_3$ responsible for the overload condition being sensed by transistor 156. In this regard, the emitter voltages of transistors 626, 628 and 630 increase as the emitter voltage of transistor 156 increases with increasing overcurrent until transistor 630 is gated to conduction. Thereafter, the emitter voltage of transistor 630 cannot increase and the current flow through resistor 618 cannot increase farther. As the emitter voltage of transistor 156 further increases, first the emitter voltage of transistor 628 and then of 626 increase so that the current flow through resistors 616 and 614 is sequentially fixed and cannot increase further. By properly proportioning the resistors 612, 614, 616, 618, and 620, the charging current for capacitor 622 can approximate the square of the signal to transistor 156. When the voltage across capacitor 622 is imposed on the gate of programable unijunction transistor (PUT) 732 through current limiting resistor 632 and reaches the level above the voltage at the gate of PUT 732, PUT 732 is triggered to fire SCR 726 and energize trip coil 12.

As shown, capacitors 636 and 638 may be selectively connected in parallel with capacitor 622 to vary the charging period to up to, say, about 10 minutes.

If the overload current being sensed drops below a predetermined level, capacitor 622 is immediately discharged by being clamped to ground through NPN transistor 634, which is normally ON but is rendered non-conductive by the non-conduction of PNP transistor 636. Transistor 636 is biased to its conductive state in the absence of overcurrent conditions and is biased to its non-conductive state by overcurrents.

The ground fault circuit 300 also controls the energization of trip coil 12 upon a predetermined level of unbalance in the current in protected conductors $L_1$, $L_2$, and $L_3$ which produces a current in the secondary of transformer 114. The voltage divider network across the secondary of transformer 114 determines the voltage across capacitor 174. When the voltage across the capacitor 174 reaches a predetermined level as determined by the value of resistors connected in the circuit, a positive signal on the base of NPN transistor 302 gates the transistor into conduction. This reduces the emitter voltage on PNP transistor 304 to change it from a conducting to a non-conducting state to shift the voltage at junction 306 and the base of NPN transistor 308 to ground voltage level to turn the transistor 308 off. Since transistor 308 serves to clamp capacitor 310 to ground when conducting, this allows capacitor 310 to be charged through resistor 312, with diode 314 allowing the charge to take place at a first rate. When the voltage across capacitor 310 reaches a level sufficient to trigger PUT 710 to fire the SCR 726 to energize trip coil 12 as in the case of the short time delay circuit previously described.

Ground faults are frequently erratic and are the result of arcing one of the phases. In order to provide a ground fault protector which will operate when there is a full short, but will not operate when the arcing is of a transient or short term nature, the discharge circuit for capacitor 310 provides for the bleeding of the charge on capacitor 310 as well as for the accumulation of the charge if the arcing should be repeated.

A dumping circuit for capacitor 310 comprises the resistor 316 and the transistor 308 which is normally in its conductive state in the absence of a ground fault. Since resistor 316 controls the rate of discharge of capacitor 310, a repetition of arcing of a given intensity within a predetermined period of time will result in the build-up of the voltage across capacitor 310 to a level to trigger the trip coil 12. However, where the ground fault disappears transistor 304 is rendered conductive to raise the base voltage of transistor 308 to render transistor 308 conductive and discharge capacitor 310 to reset the timing circuit to zero. Resistors 318 and 320 may be selectively connected in parallel with resistor 312 to reduce the time delay of the circuit.

In accordance with this invention, means are provided to safeguard the solid state control circuit from damage and malfunction under excessively high ambient temperature conditions. As shown, this takes the form of a voltage divider network comprising resistor 540 and resistor 542 connected between ground bus 236 and intermediate bus 240 with the junction between resistors 540 and 542 being connected to the base of NPN transistor 526 of the short time delay control circuit 500 through blocking diode 544. In practice, resistor 540 may be a resistor having a fixed resistance value and resistor 542 a highly temperature sensitive resistor, i.e., a thermistor with a positive coefficient of resistance with increasing temperature, say, 4 percent increase in resistance per degree centigrade temperature rise.

Since the voltage at the junction between resistors 540 and 542 will rise with increased temperature, it is apparent that, with suitable relative sizing of resistors 540 and 542, the voltage at the base of transistor 526 will rise to the level to render transistor 526 conductive thereby rendering transistors 522 and 518 nonconductive as hereinbefore described so that the capacitor 520 will become charged after a short time delay to trigger PUT 710 and SCR 726 to energize trip coil 12.

It is apparent that similar results could be obtained if resistor 542 is a resistor of fixed resistance value and resistor 540 a thermistor having a negative temperature coefficient or if such a voltage divider network is used to shift the conductive state of any transistor which would cause trip coil 12 to be energized. Moreover, the thermal override circuit could be utilized in the control of a transistor in the ground fault, the long time delay and the instantaneous time delay control circuits, if desired. However, its use in the short time delay control circuit is preferred since a delay of, say, 0.3 seconds will prevent a false triggering during transient conditions before power supply voltage fully builds-up to steady state conditions as well as where the d.c. bus 240 is excessively noisy.

From the foregoing, it is apparent that this invention provides an efficient, simple, and reliable overtemperature protective circuit for safeguarding the components of the solid state control circuit against damage or malfunction due to high ambient temperature conditions.

As will be apparent to persons skilled in the art, various modifications, adaptations and variations of the foregoing specific disclosure can be made without departing from the teachings of the present invention.

I claim:

1. A circuit breaker for a protected polyphase circuit comprising separable contacts, operating means for opening and closing said contacts, a latch for maintaining said contacts in their closed position, a trip coil for tripping said latch, a switch for controlling the energization of said trip coil, a control element for controlling the conduction of said switch, a first control circuit for generating a triggering signal for said switch upon the occurrence of a predetermined condition in any one of the phases of said protected circuit, and a second control circuit for generating a triggering signal independently of the occurrence of such predetermined condition upon an increase in the ambient temperature of said control circuit to a predetermined level, said first and second control circuits each being connected to the control element of said switch to shift the conducting state of said switch when the signal generated by either control circuit reaches the triggering level unaided by the other.

2. The device of claim 1, wherein said switch is a transistor and said second control circuit includes a voltage divider network comprising a resistor and a thermistor connected to shift the conducting state of the transistor upon such increase in ambient temperature.

3. The device of claim 2 wherein said voltage divider network is connected across a fixed voltage and the junction between the resistor and the thermistor is connected to the base of said transistor.

4. The device of claim 2 wherein said first control circuit and said second control circuit are each connected to the base of said transistor through separate diodes connected to form an OR input circuit for the control of the switch wherein the highest voltage signal delivered by one of the control circuits back biases the other and prevents its conduction.

5. The device of claim 4 wherein the transistor is an NPN transistor and the voltage at said junction increases with temperature rise.

6. The device of claim 2 wherein said shift in the conducting state of said transistor occurs at about 80° C.

7. The device of claim 1 including means for requiring the continuous duration of a signal of triggering level to be generated by said control circuits for a preselected short time interval prior to the tripping of said latch.

8. The device of claim 7 wherein the interval is about 0.3 seconds.

* * * * *